I. N. PYLE.
Improvement in Cultivators.
No. 114,040. Patented April 25, 1871.
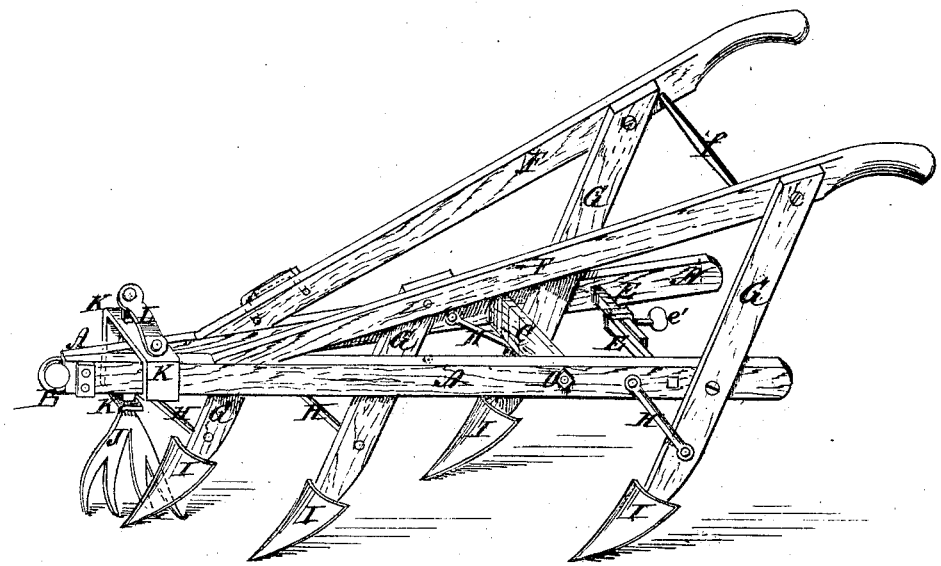
Witnesses:
C. Raettig.
L. S. Mabee
Inventor:
I. N. Pyle
per Munn & Co
Attorneys.

United States Patent Office.

ISAAC N. PYLE, OF PLEASANT MILLS, INDIANA.

IMPROVEMENT IN CULTIVATORS.

Specification forming part of Letters Patent No. 114,040, dated April 25, 1871.

*To all whom it may concern:*

Be it known that I, ISAAC N. PYLE, of Pleasant Mills, in the county of Adams and State of Indiana, have invented a new and useful Improvement in Cultivators; and I do hereby declare that the following is a full, clear, and exact description thereof, which will enable others skilled in the art to make and use the same, reference being had to the accompanying drawing, forming part of this specification.

The figure is a perspective view of my improved cultivator.

My invention pertains to an improved attachment to cultivators; and it consists in a forked or pronged clod-fender, in connection with a double-armed bracket and a plate-spring, so arranged that the shank of the fender shall have a firm support, while permitted to play vertically to the extent allowed by the spring. The fender, being pronged, serves to keep clods, stones, &c., from the young plants, without also preventing the loosened earth from being thrown around them, in manner usual in machines of this class.

In the drawing, A indicates the beams; B, the clevis; C, a cross-bar, through which passes a tie-rod, D; E E, cross-bars at rear end of the beams; G, the standards; H, the shovels; F, the handles, and *f* the round connecting same, all these parts forming a cultivator to which my improvement is shown attached.

When desired, I propose to adjust the beams A apart at their rear ends by means of the bars E E and clamp-screw *e*, in which case the rod D and round *f* are supplemented by longer ones.

J is the clod-fender, the lower part of which is made pronged or forked, as shown in the drawing. The shank or standard of the clod-fender J passes up through the supporting-bar K, as shown in the figure, and its upper end is attached to the free end of a spring, L, the other end of which is attached to the bar K. The bar K passes around the forward parts of the beams A, and its projecting end is bent twice at right angles, as shown in the figure, so that the standard or shank of the clod-fender may pass twice through it and be firmly supported. This construction of the clod-fender enables it to rise and pass over any obstructions, the spring L forcing it down to its place as soon as it has passed the obstruction.

I am aware that it is not new to provide a spring attachment for clod-fenders, and to such construction I make no claim.

Having thus described my invention, I claim as new and desire to secure by Letters Patent—

The bracket K, having the form and applied to the beams A as shown, and the fender J and spring L, arranged therewith as specified, whereby the shank of said fender has a double bearing and a vertical play in the bracket, for the purpose set forth.

ISAAC N. PYLE.

Witnesses:
 THOS. DYE,
 S. W. WILLIAMS.